Figure 15:
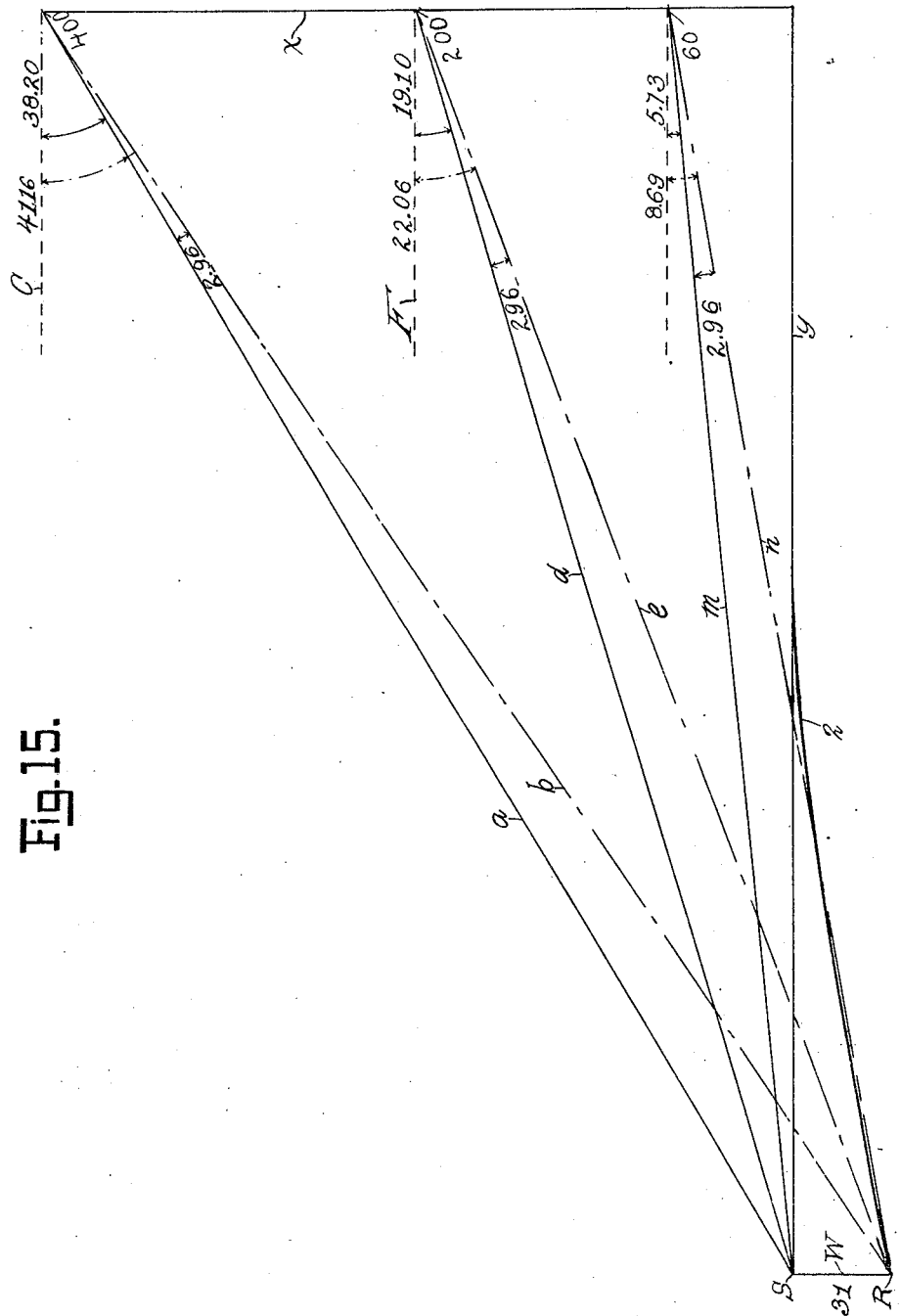

No. 851,706. PATENTED APR. 30, 1907.
A. SWASEY.
DEPRESSION RANGE FINDER.
APPLICATION FILED APR. 25, 1906.
7 SHEETS—SHEET 1.
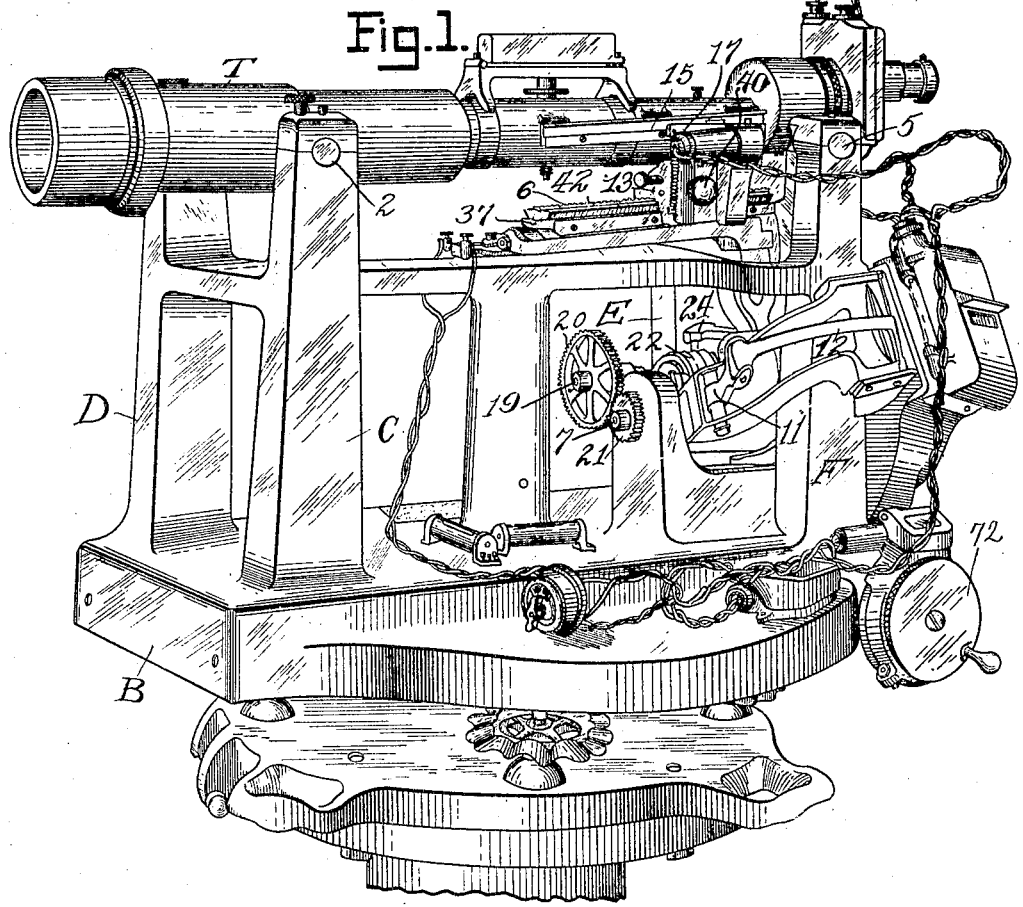
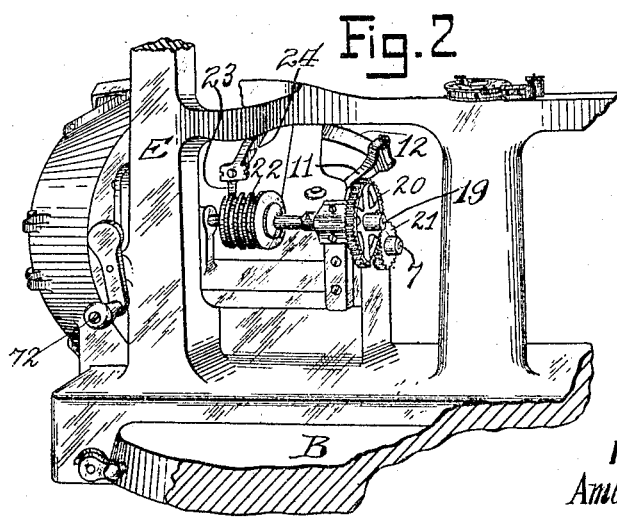
Witnesses:
H. Fleischer
A. Horton Gibbs
Inventor
Ambrose Swasey,
By his Attorney,
F. H. Richards.

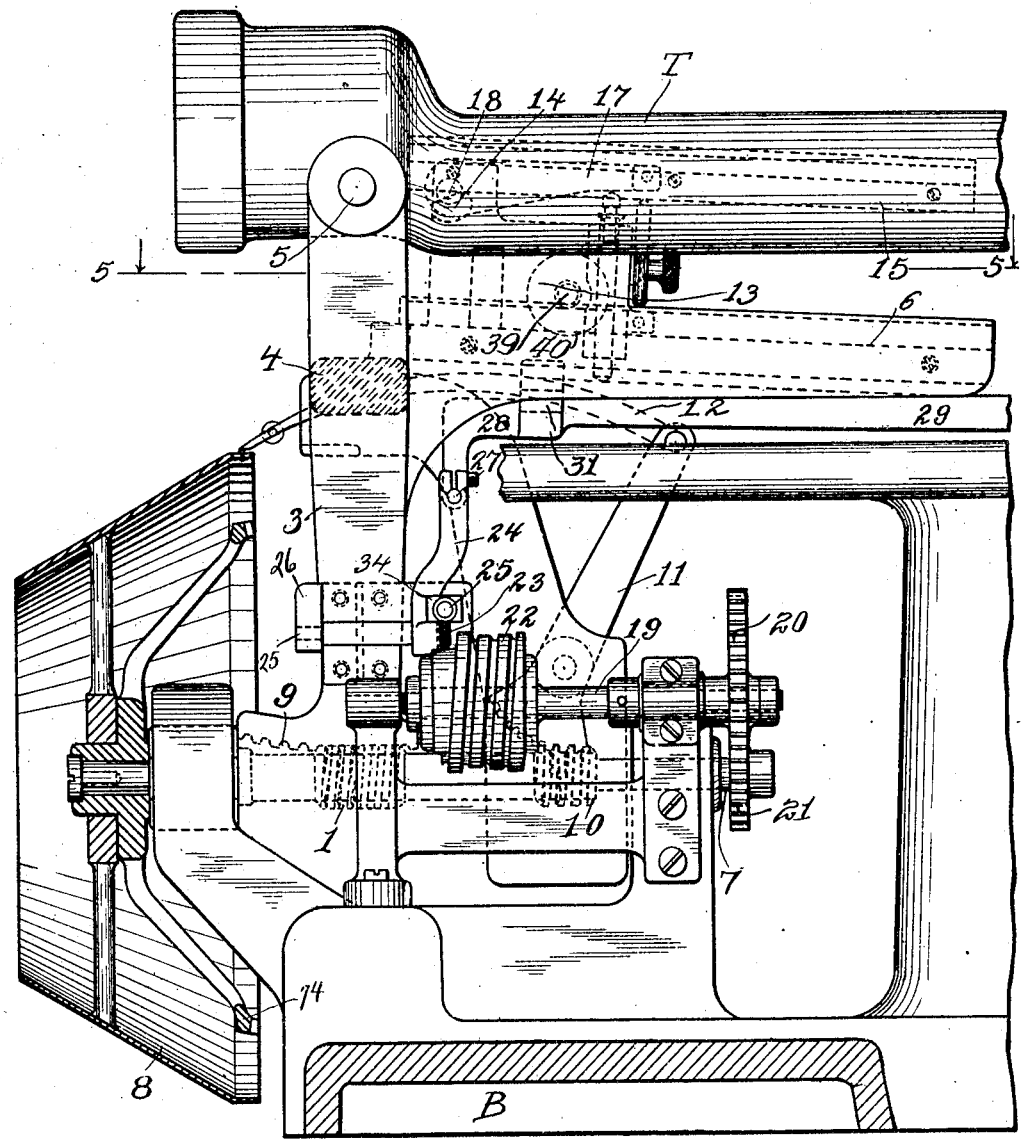

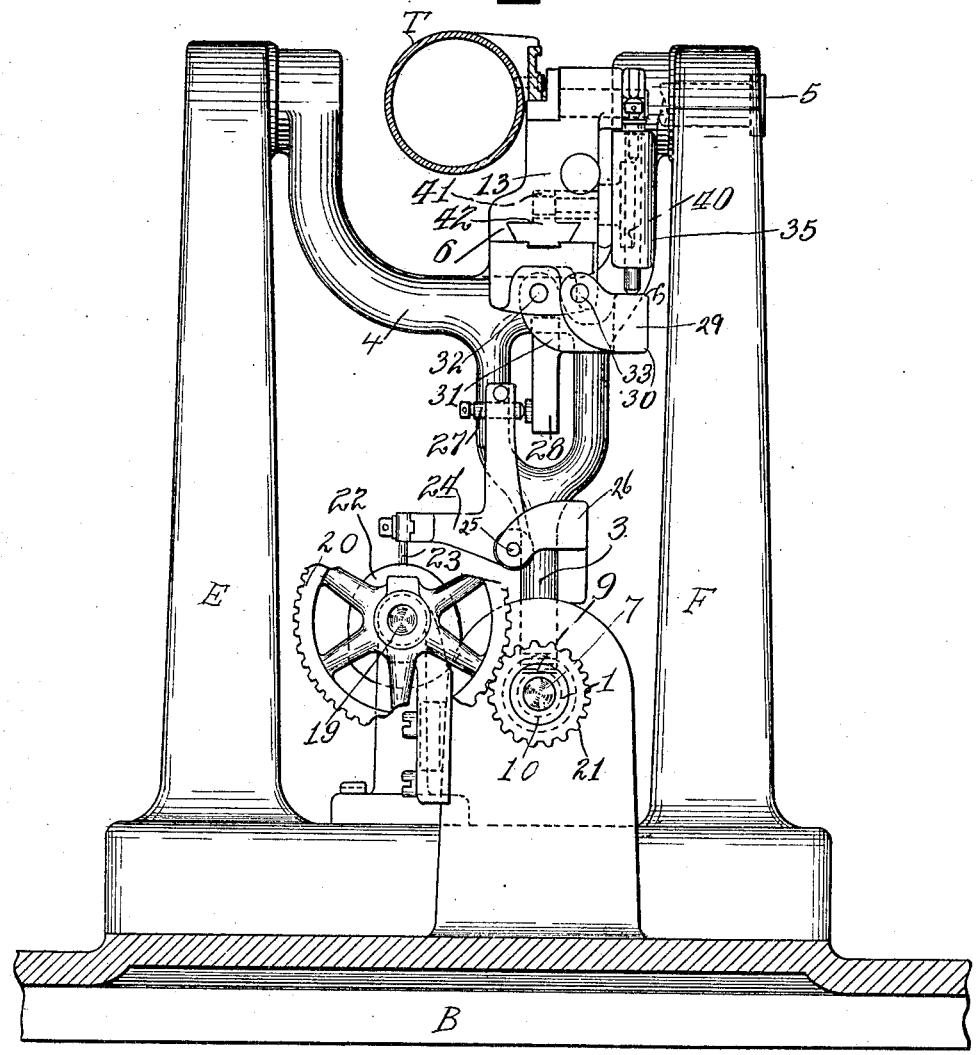

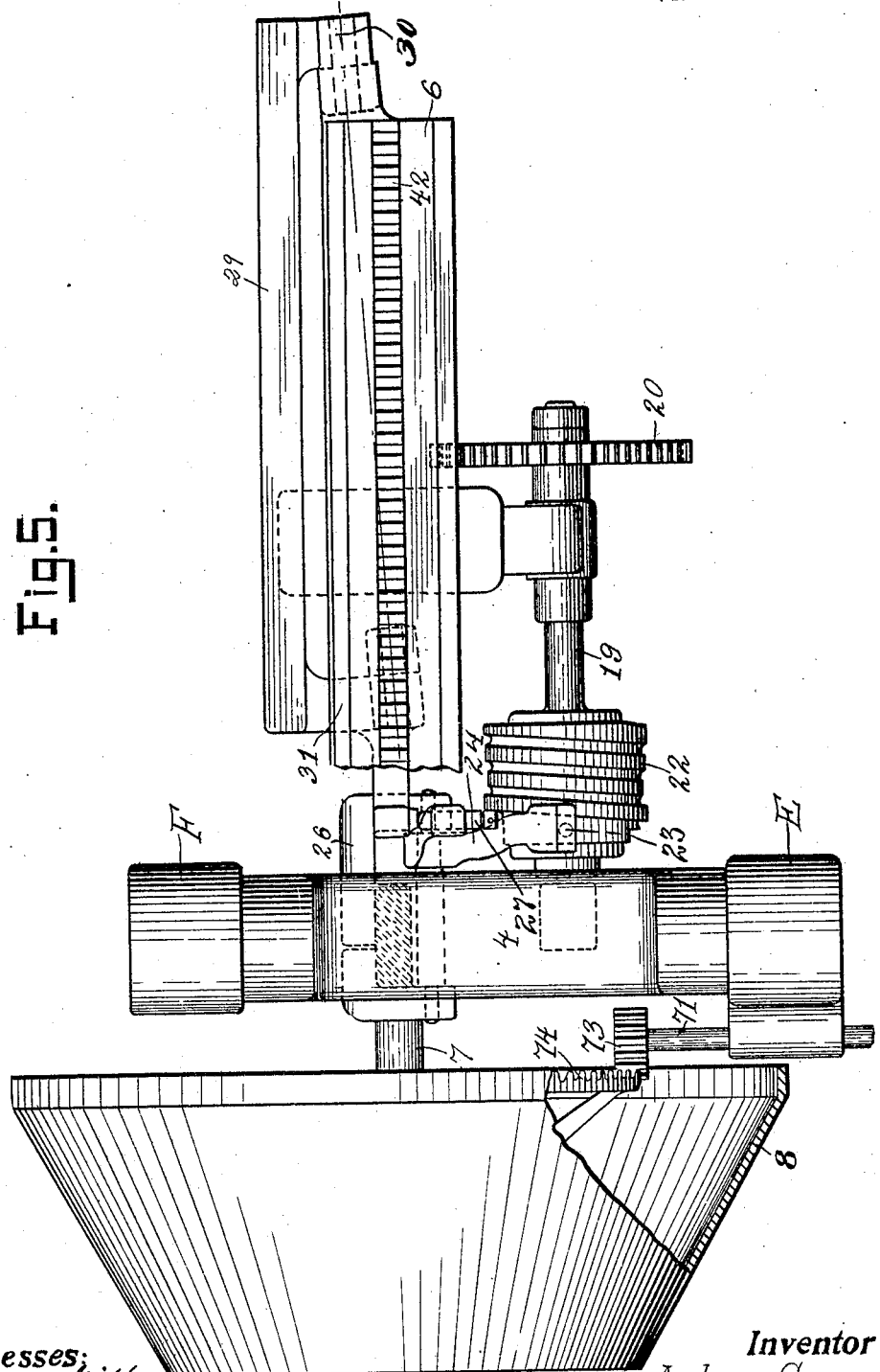

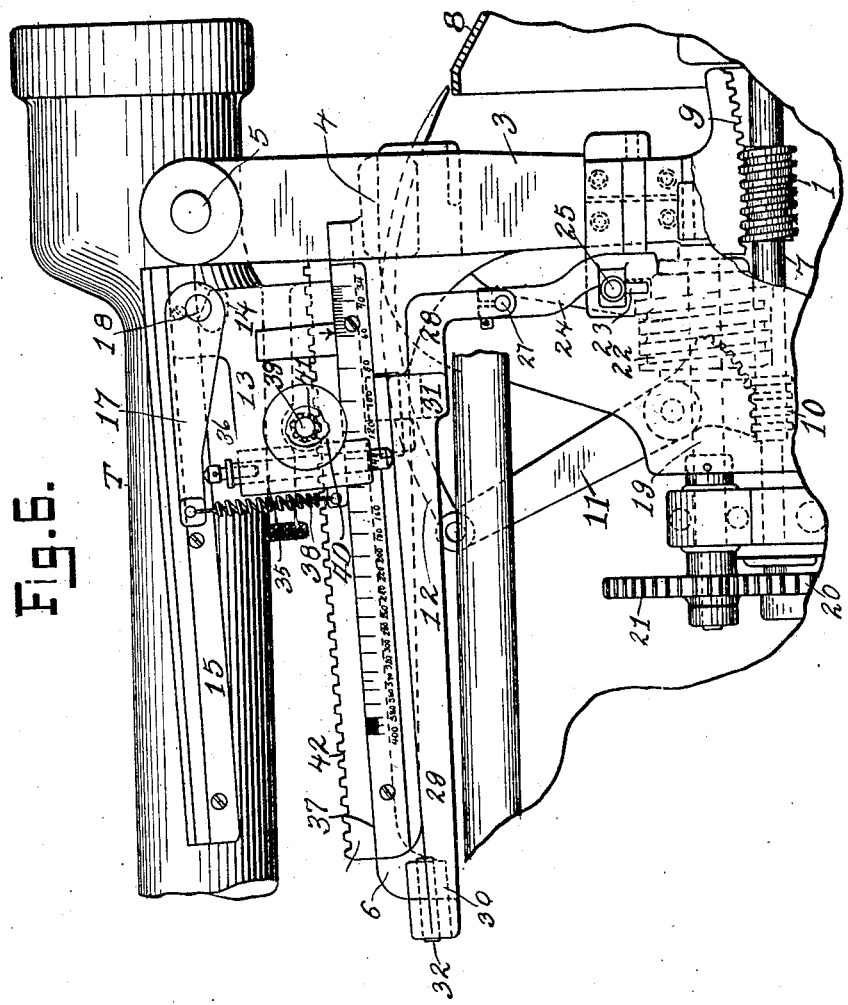

No. 851,706.
PATENTED APR. 30, 1907.
A. SWASEY.
DEPRESSION RANGE FINDER.
APPLICATION FILED APR. 25, 1906.
7 SHEETS—SHEET 6.
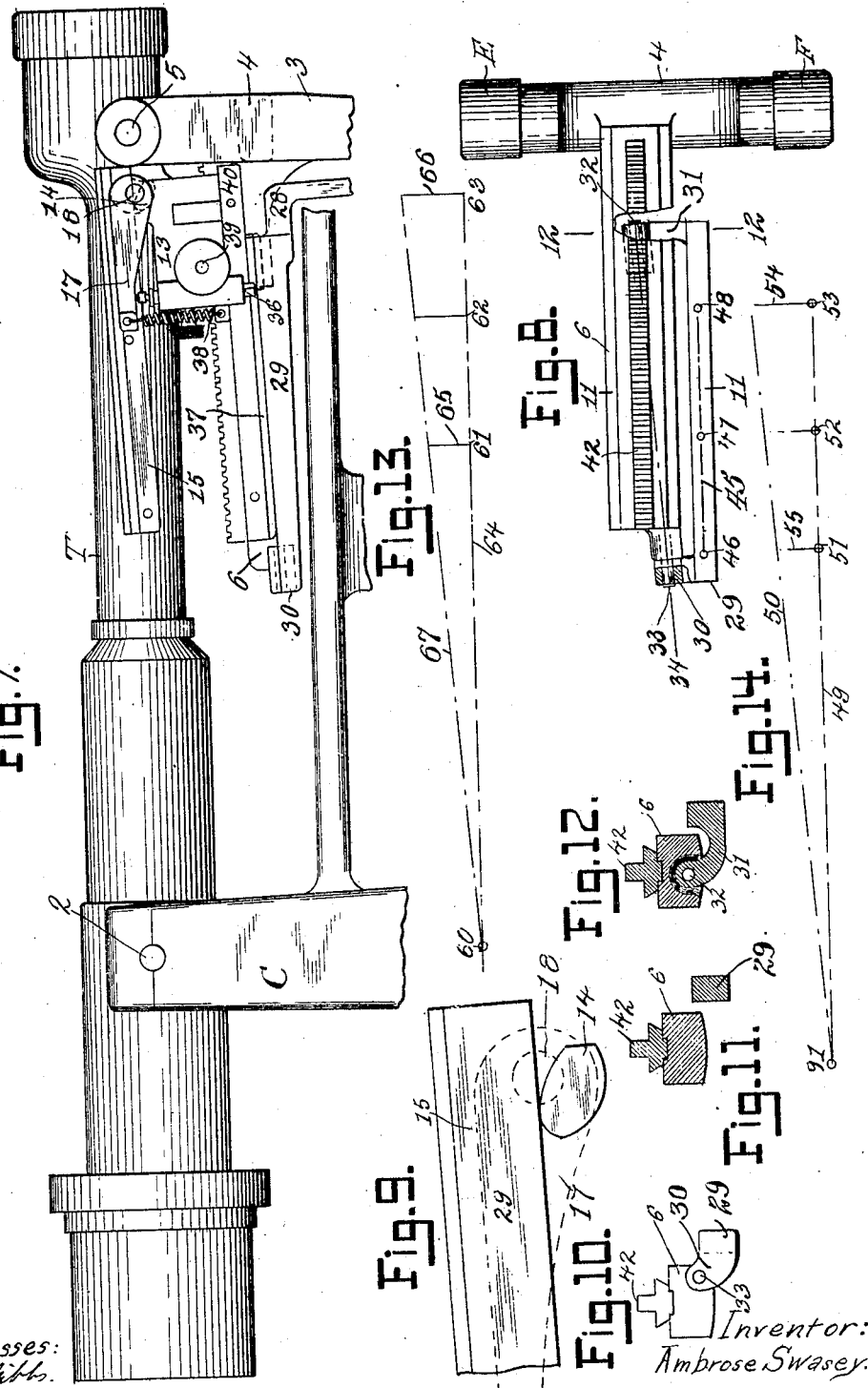
Witnesses:
Inventor:
Ambrose Swasey.
By his Attorney, No. 851,706. PATENTED APR. 30, 1907.
A. SWASEY.
DEPRESSION RANGE FINDER.
APPLICATION FILED APR. 25, 1906.

7 SHEETS—SHEET 7.

Witnesses

Inventor
Ambrose Swasey.
By his Attorney,

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

DEPRESSION RANGE-FINDER.

No. 851,706.  Specification of Letters Patent.  Patented April 30, 1907.

Application filed April 25, 1906. Serial No. 313,558.

*To all whom it may concern:*

Be it known that I, AMBROSE SWASEY, a citizen of the United States, residing in Cleveland, in the county of Cuyahoga and State of Ohio, have invented certain new and useful Improvements in Depression Range-Finders, of which the following is a specification.

This invention relates to depression range finders, that are used for determining the range or distance removed an object is from the vertical axis of the instrument; by reason of the altitude of the instrument above sea level being a known factor and the range being determined from the angle or depression of the object from the horizontal line of the telescope where leveled; the distance bearing certain known relations to such depression angle for certain altitudes.

The present invention is in the nature of an improvement on, or additional feature applied to, depression range finders, on which a patent was granted me by the United States Patent Office, on September 1, 1903, Number 737,794. In that instrument a telescope is supported to tilt and is operably connected with a range indicating mechanism, including a device adjustable to correspond with various altitudes of the instrument: whereby on the adjustment for a certain altitude, and the telescope being tilted to sight an object, indicating mechanism will indicate the range of the object. But such instrument does not take into consideration the factor of the curvature of the earth, which in long ranges sur as 12,000 yards amounts to a drop of 31 feet.

The object of the present invention is to provide in a depression range finder, a corrective mechanism that will be practically accurate for all adjustments for a considerable range of altitude, and which will be practically accurate for the limit of range indication, for every altitude within such limits.

In the said patent granted to me, a movable member or carriage is advanced along a tilting arm to adjust for various altitudes of the instrument, the carriage serving as an operative connection between the arm and telescope whereby the swinging of the arm will tilt the telescope. To correct for earth's curvature in the present invention, an additional tilt is given to the telescope by the carriage, which tilt is proportional to the movement that is given to the arm; that is, is proportional to the range. But as the carriage advances along the arm, it approaches or recedes from the axis on which the telescope tilts. This would vary the corrective movement between the carriage and telescope for the same range, and therefore a correction that was accurate for one altitude and range would be inaccurate for any other altitude greater or less for the same range. One of the objects of the present invention is to provide means to compensate for the adjustment of the carriage for altitude, whereby the corrective tilt given to the telescope is constant for the range notwithstanding the shifting of the carriage along the arm for altitude adjustment.

In the drawings illustrating one embodiment of my invention Figure 1 is a perspective view from the front side of the instrument. Fig. 2 is a fragmentary perspective from the rear side. Fig. 3 is a partial front elevation, partly in section, showing the corrective mechanism. Fig. 4 is an end elevation, certain parts being broken away. Fig. 5 is a section on the line 5—5 indicated in Fig. 3. Fig. 6 is a fragmentary view in front elevation. Fig. 7 is a front elevation of the upper portion of the instrument. Fig. 8 is a partial plan of parts shown in Fig. 7. Fig. 9 is a view showing the rocking cam and its engaging bar. Fig. 10 is an end view of parts indicated in Fig. 8. Fig. 11 is a section on the line 11—11 of Fig. 8. Fig. 12 is a section on the line 12—12 of Fig. 8. Figs. 13 and 14 are diagrams indicating the relation of certain parts. Fig. 15 is a diagram illustrating the depression angle caused by earth's curvature.

On a suitable base B are mounted two pillars C and D between which the optical member or telescope T of the instrument is pivoted on an axis 2. The telescope is tilted by being operably connected with a bent lever 3 having a forked portion 4 whose ends are pivoted between two uprights E and F on an axis 5. This lever has an approximately horizontal arm 6. On the base is mounted in suitable bearings a shaft 7 carrying at one end a drum 8, that is conical in the present instance. A worm 1 fast on the shaft 7 meshes with a tooth sector 9 on the lower end of the lever 3, whereby the rotation of the drum will swing the bent lever. The shaft 7 carries another worm 10 engaging the teeth of a segment lever 11. The other end of this lever is pivotally connected with an index arm 12 whose end will travel over the periphery of the drum 8 from edge to edge as the drum rotates. The latter worm and segment are arranged to cause the extremity of the pointer 12 to follow a spiral line encircling the drum. In the present instance the drum makes about six revolutions while the pointer travels from edge to edge.

A movable member or carriage 13 is suitably mounted on the horizontal arm 6 of the bent lever to travel along the same. Suitable connecting mechanism is provided between the carriage 13 and the telescope T, whereby the swinging of the arm 6 and carriage will tilt the telescope. For a given position of the carriage on the arm, the rotation of the drum will swing the arm by the said operating means and the pointer will indicate the range according to the amount of tilt of the telescope. This indication is laid out on the surface of the drum, either from actual test, or from computation. Such indication is correct for one altitude only, the one at which the test was made, or for which computed. But by adjusting the carriage 13 along the arm 6, obviously the carriage will be given a greater or less movement for the same swing of the arm, as it approaches or recedes from the axis 5 of the arm. This latter adjustment will compensate accurately for different altitudes; moving the carriage toward the axis of the arm will adjust for less altitude, and moving it away from the axis 5 will allow for a greater altitude. These altitude indications are determined by test or calculation and the marks corresponding thereto are placed on the arm 6, as shown in the drawings. But such indication would be accurate only for a theoretical horizon that is a plane surface rectilinear, and error is introduced by reason of the curvature of the earth's surface. In short ranges such curvature is of small importance, but in long ranges it becomes a very grave error; as at 12,000 yards the depression of such curvature amounts to 31 feet below a straight horizontal line perpendicular to the vertical line at the location of the telescope. Therefore it is necessary to provide means for giving additional tilt to the telescope for such curvature, which must vary according to the range. While theoretically this compensation for the earth's curvature varies also with the altitude, for all practical purposes of range finders wherein altitudes up to about 400 feet maximum are used, with ranges varying from 1500 to 12,000 yards, the difference of earth's curvature for such altitudes is almost infinitesimal and is therefore negligible, and need not be taken into consideration.

From actual experiment certain angles of depression have been adduced, as indicated in the illustrative diagram of Fig. 15. The range finder is used at altitudes varying from about 60 or less to 400 feet, which in this figure is indicated by the vertical line $x$. The range for which the instrument is used varies from 1500 to 12,000 yards, which is indicated by the horizontal line $y$. But the altitude of 400 feet compared with a range of 12,000 yards or 36,000 feet is approximately about 1%. Therefore such angles or triangles, having the base 100 times the altitude, could not be laid out on a diagram for any practical use. In this diagram the telescope can be considered as placed at the point indicated on the line $x$ by 400 and sighted at an object S at the extremity of the line $y$, the line of sight being indicated by the full line $a$. The line $y$ indicates a theoretical horizon or one perpendicular to the vertical line of the telescope, the line $x$. But it is a well known fact that for a distance of 12,000 yards the depression for earth's curvature amounts to 31 feet approximately. This is indicated on the diagram by the line $w$. The telescope is next depressed to sight a point R at the bottom of line $w$, and the line of sight in this position is represented by the broken line $b$. The point R lies on the line 2 representing the curvature of the earth's surface. From the angular measurement of the telescope with the horizontal line at its position indicated by the line $c$, the lines $a$ and $c$ make an angle of 38.20 minutes; while the lines $c$ and $b$ make an angle of 41.16 minutes; the difference of which amounts to 2.96 minutes. This latter angle is the correction, or amount which the telescope must be additionally tilted to accommodate for earth's curvature. The telescope is next placed at the position 200 on the line $x$ and then sighted at the object at S. The line of sight will be indicated by line $d$; and the line of sight when the telescope is depressed to sight the point R for the depression of earth's curvature, will be indicated by the line $e$. The line $d$ makes an angle with the horizontal line $f$ of 19.10 minutes; while the line $e$ makes an angle with the line $f$ of 22.06 minutes. But the difference of these two angles, that is the depression for correction for earth's curvature is 2.96 minutes; which is the same as the depression for such correction when the telescope was at the elevation of 400 feet. Next, suppose the telescope to be placed at an elevation of 60 feet above the horizontal line $y$. The angle of depression for the points S and R at this latter elevation are respectively 5.73 for the line of sight $m$ and 8.69 for the line of sight $n$. The difference of the two latter angles is 2.96 which is the angle of depression to correct for earth's curvature; and is the same as the two other instances. Therefore it appears from actual observation and experiment that this angle of depression for the same range is constant for altitudes varying from 60 to 400 feet. Theoretically, this angle will decrease as the altitude increases; but such increase is so infinitesimal that for all practical uses of a range finder, it is too small to be determined or indicated, and is therefore negligible and will not introduce any material error in the indications of the instrument. Therefore, a mechanical corrector can be introduced operating between the carriage 13 and the telescope T that will give the additional tilt to the telescope to correct for earth's curvature. This additional motion must vary from the minimum to the maximum range to correspond with the earth's curvature; but such a correction being introduced for one altitude will be practically accurate at the other altitudes within the given range of altitudes of the instrument; such range in the present case is approximately from 40 to 400 feet.

In the present construction, a cam member 14 is pivotally mounted on the carriage and engages a suitable portion of the telescope T such as the under surface of a bar 15 fast thereon. This cam member is fast on a lever 17 swinging on the pivotal axis 18 of the cam. Means are provided for swinging this lever in a fixed relation to the movement of the drum 8, and which relation will not be varied by the adjustment of the carriage 13 along the arm 6 to provide for the different altitudes of the instrument. On the base B is mounted a second shaft 19 rotated from the drum shaft 7 by gears 20 and 21 on the respective shafts, the shafts being geared down to cause the shaft 19 to rotate at ⅓ the speed of the shaft 7. On the shaft 19 is a conical worm 22, that is engaged by a pin 23 on the extremity of an angle lever 24. This lever is pivoted on a rock shaft 25 swinging in a bearing block 26, that is fast on the bent lever 3; but it will be observed that the axis of the lever 24 is not parallel with the axis 5 of the lever 3, but transverse thereto. By this means when the lever 3 swings, the lever 24 will be given a motion of translation, whereby its pin 23 will move in an arc that is substantially parallel with the axis of the shaft 19. In other words, the pin 23 will travel along the worm 22. But this cam and its shaft are so organized, that as the lever 3 swings, the shaft and worm 22 rotate to carry the pin along the worm; the pin advancing the pitch of the worm for each revolution. Now, the axis of the angle lever 24 being substantially parallel with the axis of the conical worm 22, the raise of the worm will swing the bent lever on its axis. At the upper end of the lever 24 is a pin 27 that engages an arm 28 depending from a rock-bar 29. This rock-bar has arms 30 and 31 at its extremities that form bearings for pins 32 and 33, carried by the arm 6, on which latter arm the rock-bar can oscillate. Since the angle lever 24 is mounted on the lever 3 to which the arm 6 is secured, these members travel together, and the swing of the lever 24 by the worm 22 will cause a definite movement of the rock-bar 29 throughout the movement of the shaft 7 and range drum. The drum is rotated by a spindle 71 rotatable on the upright E by handle 72; and a gear 73 on spindle 71 engages a gear 74 fast on the drum.

The carriage 13 has a suitable bearing portion in which reciprocates a slide 36, and the lower end of the slide during the travel of the carriage along the arm 6, will travel along the upper face 37 of the rock-bar 29. The upper end of the slide 36 engages the lower face of the cam lever 17, so that the reciprocation of the slide 36 will swing the cam lever and cause different portions of its cam face to engage the telescope supporting bar 15. A coil spring 38 has its lower end secured to the carriage 13, while its upper end is fastened to the extremity of the cam lever 17, which causes the lever to press against the upper end of the slide 36. By this construction, when the arm 6 of the bent lever is rocked through the reciprocation of the drum shaft 7, the carriage will partake of the movement of the arm 6, and engaging the telescope bar 15 by its cam 14, will tilt the telescope on its axis 2.

To adjust the tilt for different altitudes, the carriage is moved along the arm 6 by suitable means; in the present instance comprising a spindle 39 rotatable in the carriage, by a head 40, which operates a gear 41 that engages a rack 42 on the upper part of the arm 6. When, by this means, the carriage is moved out along the arm, receding from the axis 5 of the arm, for the same movement of the indicating drum and arm 6, the cam will evidently tilt the lever a greater distance, for two reasons. The cam being also moved away from the axis 5 of the arm will traverse a greater arc by reason of the greater angular motion of the arm 6. But this movement of the cam will bring it nearer to the axis 2 of the telescope, and as the cam moves up through a greater distance, it will cause the telescope to tilt more than if the cam approached the axis of the telescope but moved up through the same distance.

The axis 34 of the rock-bar 29, where its arms 30 and 31 are pivoted on the arm 6, is inclined horizontally to the axis of the arm; which latter is substantially parallel with the axis of the telescope. From this arrangement it follows that as the slide 36 travels along the rock-bar, the path of its engaging end will be inclined to the axis 34. In Fig. 8, the line 45 represents the path of travel of the slide along the rock-bar, three positions being indicated by the circles 46, 47 and 48. In the diagram of Fig. 14 the lower line 49 represents a continuation of the line of travel of the slide; while the line 50 corresponds to the axis 34 of the rock-bar, these two lines meeting at the point 51 and making the same angle as do the lines 34 and 45, as shown in Fig. 8. In this diagram, the circles 51, 52 and 53 correspond in position to the circles 46, 47 and 48 of the slide on the rock-bar. It will be observed that when the carriage is advanced to move the slide laterally, (not endwise), from the position of 48 to that of 46, the lower end of the slide will approach the axis of the rock-bar by a distance proportional to the length of the lines 54 and 55 of the diagram.

As has been set forth, the rock-bar 29 is oscillated from the drum shaft 7 a certain distance, which depends upon the movement of the shaft, and is independent of the movement of the carriage along the arm 6, for altitude adjustment. From this it follows that as the end of the slide is now nearer the axis of the rock-bar, its distance elevated or depressed by the swing of the rock-bar, will be reduced directly proportional to its distance from such axis. In Fig. 13 the circle 60 represents the axis 2 of the telescope, while the points 61, 62 and 63 on the line 64 represent respective positions of the cam 14 along the supporting bar 15 of the telescope, corresponding to the positions 46, 47 and 48 of the slide on the carriage, being the same distance apart. The instrument is designed so that the axis 60 is the same distance from these points 61, 62 and 63 as the corresponding points 46, 47 and 48, are from the apex 91 of the lines 49 and 50. When the carriage is in the position bringing the slide at 48, the cam will engage the bar 15 of the telescope at 63; while when the carriage is shifted to bring the slide to the place 46 the cam will approach the axis to and will be located in the position indicated relatively by the point 61. When the carriage was in the former position, and the arm 6 moved through a certain distance for a given range, the slide was moved on the carriage by the swinging of the rock-bar a certain distance, represented by the line 54. Upon shifting the carriage to bring the slide to the position 46, for the same range movement of the drum and swing the arm 6 and rock-bar, the slide will move on the carriage a less distance, represented by the line 55. Now, the two lines 66 and 65 are drawn equal to the lines 55 and 54 respectively and which are perpendicular to the lines 64 and 49 respectively. From their geometrical relations, therefore by drawing the line 67 from the point 60 to the extremities of the lines 67 and 66, we have right angle triangles that are equal. From this condition we get the following result. When the drum shaft is swung a certain distance, the arm 6 will be swung and elevate the telescope a certain distance. Suppose the carriage to be at the right hand end with the cam in the position of 63 and the slide engaging the rock-bar at 48. During this movement of the arm 6, the rock-bar 29 will be given an additional tilting movement through the above described mechanism, and the slide 36 will be elevated. It will be raised its maximum distance, which can be represented by the line 54 in Fig. 15, because in this position the slide extremity is at its maximum distance from the axis 34 of the rock-bar. Upon advancing the carriage to the other end of the arm 6, until the slide extremity engages the bar at 46, the cam 14 will engage the telescope arm 15 at the place 61. Upon again moving the drum shaft to swing the arm 6 through the same distance it was moved in the previous instance, since the slide 36 has been brought nearer the axis 34 of the rock bar, it will be elevated in the carriage a less distance than before, which is relatively indicated by the line 55. In the former instance the slide being elevated a distance indicated by the line 54, the telescope will be given additional tilt by reason of the swing of the cam 14 by its arm 17 being rocked a distance corresponding to the line 66. But the slide will now be elevated a less distance, proportional to the former as the line 55 is proportional to the line 54; and the lever and cam will be rocked an amount proportional to the former movement, as the line 66 is proportional to the line 65. But from the diagram of Fig. 14 it will be seen that, while the cam has approached the axis 2 of the telescope, the tilt given to the telescope will be the same as in the former case, because the approach of the cam to the axis of the telescope is compensated for by the smaller movement imparted to the cam and lever by the slide. And the same is true for any intermediate position between the positions 46 and 48 of the rock-bar, the additional tilt of the telescope by the slide 36 and cam lever, being absolutely the same in amount, for the same swing of the arm 6, for all positions of adjustment of the carriage along the arm 6. Because, as the carriage is moved toward the telescope axis 2, which would tend to swing the telescope a greater distance for the same swing of the cam 14, the cam lever is given a smaller movement because of the slide that engages the cam lever approaching the axis of the rock-bar and having imparted thereto a proportionately less movement.

Having thus described my invention, I claim:

1. In a range finder, the combination of a telescope supported to be tilted on an axis, a range indicating mechanism, mechanism operably connecting the indicating mechanism and telescope whereby the indicating mechanism will give the range according to the tilt of the telescope on an axis, said connecting mechanism being adjustable for indicating the range at different altitudes of the range finder, and a corrective mechanism operably connected with said connecting mechanism and organized to further tilt the telescope on said axis to automatically correct for earth's curvature throughout the limits of the range indicator irrespective of the said altitude adjustment of connecting mechanism.

2. In a range finder, the combination of a telescope supported to swing on an axis, a lever pivoted on a different axis, a range indicating mechanism operably connected with said lever, mechanism operally connecting the lever and telescope whereby the indicating mechanism will give the range according to the swing of the telescope on said axis, said connecting mechanism being adjustable for indicating the range at different altitudes of the range finder, and a corrective mechanism operably connected with the mechanism connecting the lever and telescope and organized to further tilt the telescope on said axis to automatically correct for earth's curvature throughout the limits of the range indicator irrespective of the said altitude adjustment of connecting mechanism.

3. In a range finder, the combination of a telescope supported to swing on an axis, a lever pivoted on an axis parallel with said axis, a range indicating mechanism operably connected with said lever, mechanism operably connecting the lever and telescope whereby the indicating mechanism will give the range according to the swing of the telescope on said axis, said connecting mechanism being adjustable for indicating the range at different altitudes of the range finder, and a corrective mechanism operably connected with the mechanism connecting the lever and telescope and organized to further swing the telescope on said axis to automatically correct for earth's curvature throughout the limits of the range indicator irrespective of the said altitude adjustment of connecting mechanism.

4. In a range finder, the combination of a telescope mounted to tilt, a pivoted lever, a range indicating mechanism operably connected with the lever, a carriage movable on said lever and having an operable connection with the telescope whereby the tilting of the telescope will be indicated by the range indicating mechanism, said carriage being movable on the lever for varying the range indication of the telescope movement to correspond with different altitudes of the range finder, and a corrective mechanism having a member operating between the carriage and telescope, such mechanism being organized to further tilt the telescope to automatically correct for earth's curvature throughout the range indications of the indicating mechanism, irrespective of the altitude adjustment of the carriage on the said lever.

5. In a range finder, the combination of a telescope mounted to swing on an axis transverse thereto, a lever pivoted on a different axis, a range indicating mechanism operably connected with the lever, a carriage movable on said lever and having an operable connection with the telescope whereby the swinging of the telescope will be indicated by the range indicating mechanism, said carriage being movable on the lever for varying the range indication of the telescope movement to correspond with different altitudes of the range finder, and a corrective mechanism having a member operating between the carriage and telescope, such mechanism being organized to further tilt the telescope to automatically correct for earth's curvature throughout the range indications of the indicating mechanism, irrespective of the altitude adjustment of the carriage on the said lever.

6. In a range finder, the combination of a telescope mounted to tilt, a pivoted lever, an indicator mechanism operably connected with such lever, a carriage movable on said lever, a cam member movable on the carriage and engaging the telescope member by its cam surface to tilt the telescope upon the cam being swung on the carriage, the carriage being adjustable on the lever to vary the relative movement of the telescope and range indicator to provide for the range indication for different altitudes of the range finder, and mechanism operably connected with the range indicating mechanism and organized to swing said cam on the carriage by a certain movement relative to the range indicating movement that is constant for all positions of the carriage on its supporting lever throughout the limits of its adjustment for altitude.

7. In a range finder, the combination of a telescope mounted to swing on a transverse axis, a lever mounted to swing on an axis parallel with said axis, an indicator mechanism operably connected with such lever, a carriage movable on said lever, a cam member movable on the carriage and engaging the telescope member by its cam surface to tilt the telescope upon the cam being swung on the carriage, the carriage being adjustable on the lever to vary the relative movement of the telescope and range indicator to provide for the range indication for different altitudes of the range finder, and mechanism operably connected with the range indicating mechanism and organized to swing said cam on the carriage by a certain movement relative to the range indicating movement that is constant for all positions of the carriage on its supporting lever throughout the limits of its adjustment for altitude.

8. In a range finder, the combination of a telescope mounted to tilt, a bent lever, an indicating drum, one arm of said lever having a toothed segment, a rotatable shaft carrying the drum and provided with a worm engaging said segment whereby the rotation of the drum will swing the lever, a pointer adjacent the drum, a carriage movable on the other arm of the lever, means operably connecting the carriage and telescope whereby the tilting of the telescope by the movement of the drum will cause the range to be indicated on the drum, the carriage being movable on its supporting lever for adjustment to vary the range indications according to different altitudes of the range finder, and corrective mechanism having a member operable in the connection between the carriage and telescope, such corrective mechanism being operably connected with the drum shaft and organized to tilt the telescope to correct for earth's curvature accurately for all the said range indications and which correction is constant throughout the adjustment of the carriage for different altitudes.

9. In a range finder, the combination of a telescope mounted to swing on a transverse axis, a bent lever mounted to swing on an axis parallel with said axis, an indicating drum, one arm of said lever having a toothed segment, a rotatable shaft carrying said drum and provided with a worm engaging said segment whereby the rotation of the drum will swing the lever, a pointer adjacent the drum, a carriage movable on the other arm of the bent lever, means operably connecting the carriage and telescope whereby the tilting of the telescope by the movement of the drum will cause the range to be indicated on the drum, the carriage being movable on its supporting lever for adjustment to vary the range indications for different altitudes of the range finder, and corrective mechanism having a member operable in the connection between the carriage and telescope, such corrective mechanism being operably connected with the indicating drum shaft and organized to tilt the telescope to correct for earth's curvature accurately for all the range indications, and which correction is constant throughout the adjustment of the carriage for different altitudes.

10. In a range finder, the combination of a telescope mounted to tilt, a bent lever, one arm of the lever having a toothed segment, a shaft supported to rotate, a worm on said shaft engaging said segment, an indicating drum fast on said shaft, a pointer adjacent the drum, a carriage movably carried by the other arm of the bent lever, a cam member movable on the carriage and engaging the telescope member by its cam surface to tilt the telescope upon the cam being swung, the carriage being adjustable on the lever to vary the relative movement of the telescope and range indicator caused by the swing of the bent lever to provide for the range indication for different altitudes of the range finder, and mechanism connected with the cam member on the carriage and operable from said drum shaft to swing the cam by a certain movement relative to the movement of the drum and which movement is constant for all positions of the carriage on its supporting lever throughout the range of the carriage adjustment for altitude.

11. In a range finder, the combination of a telescope mounted to swing on an axis transverse thereto, a bent lever, pivoted on an axis parallel with the said axis, one arm of the lever having a toothed segment, a shaft supported to rotate, a worm on said shaft engaging said segment, an indicating drum fast on said shaft, a pointer adjacent the drum, a carriage movably carried by the other arm of the bent lever, a cam member movable on the carriage and engaging the telescope member by its cam surface to tilt the telescope upon the cam being swung, the carriage being adjustable on the lever to vary the relative movement of the telescope and range indicator caused by the swing of the bent lever, to provide for the range indication for different altitudes of the range finder, and mechanism connected with the cam member on the carriage and operable from said drum shaft to swing the cam by a certain movement relative to the movement of the drum and which movement is constant for all positions of the carriage on its supporting lever throughout the range of the carriage adjustment for altitude.

12. In a range finder, the combination of a telescope mounted to tilt, a bent lever, one arm of the lever having a toothed segment, a shaft supported to rotate, a worm on said shaft engaging said segment, an indicating drum fast on said shaft, a pointer adjacent the drum, a carriage movably carried by the other arm of the bent lever, a cam member movable on the carriage and engaging the telescope member by its cam surface to tilt the telescope upon the cam being swung, the carriage being adjustable on the lever to vary the relative movement of the telescope and range indicator caused by the swing of the bent lever, to provide for the range indication for different altitudes of the range finder, an arm secured to the cam, a rock bar pivoted on the carriage supporting arm, a slide supported on the carriage to move endwise and engaging the cam arm and the rock bar by its respective ends to cause the swinging of the rock bar to tilt the cam arm, the rock bar and slide on the carriage being relatively arranged whereby the movement of the carriage away from or toward the axis of the telescope will cause the slide to engage the rock bar at a greater or less distance from its axis, and mechanism operably connecting the drum shaft with the rock bar on the lever to swing the rock bar by the rotation of the drum shaft.

13. In a range finder, the combination of a telescope mounted to tilt, a bent lever, one arm of the lever having a toothed segment, a shaft supported to rotate, a worm on said shaft engaging said segment, an indicating drum fast on said shaft, a pointer adjacent the drum, a carriage movable on the other arm of the bent lever, a cam member movably carried by the carriage and engaging the telescope member by its cam surface to tilt the telescope upon the cam being swung, the carriage being adjustable on the lever to vary the relative movement of the telescope and range indicator caused by the swing of the bent lever, to provide for the range indication for different altitudes of the range finder, a spiral cam mounted to rotate on a fixed axis, means for rotating the spiral cam from the drum shaft, an angle lever pivoted on said bent lever with its axis substantially parallel with the axis of the spiral cam, and having one arm engaging the spiral cam, the angle lever and spiral cam being relatively arranged whereby the swinging of the bent lever will rock the angle lever to cause its arm to travel along the rotating cam and be swung thereby, a rock-bar pivoted on the carriage-supporting arm, a lug on the rock-bar engaged by the other arm of the angle lever to swing the rock-bar, an arm secured to the cam on the carriage, a slide movable in the carriage with its respective ends engaging the cam arm and the rock-bar, whereby the rock-bar will swing the cam arm, the rock-bar having its axis inclined relative to the path of travel of the slide thereon whereby movement of the slide along the rock-bar as the carriage is adjusted along its supporting arm will change the distance of the slide from the axis of the rock-bar to vary the swing of the cam by the rock-bar.

14. In a range finder, the combination of a telescope mounted to tilt, a bent lever, one arm of the lever having a toothed segment, a shaft supported to rotate, a worm on said shaft engaging said segment, an indicating drum fast on said shaft, a pointer adjacent the drum, a carriage movably carried by the other arm of the bent lever, a member movable on the carriage engaging the telescope member to tilt the telescope upon such member being moved, the carriage being adjustable on the lever to vary the relative movement of the telescope and range indicator caused by the swing of the bent lever, to provide for the range indication for different altitudes of the range finder, a spiral cam mounted to rotate on a fixed axis, means for rotating the spiral cam from the drum shaft, an angle lever pivoted on said bent lever with its axis substantially parallel with the axis of the spiral cam and having one arm engaging the spiral cam, the angle lever and spiral cam being relatively arranged whereby the swinging of the bent lever will rock the angle lever to cause its arm to travel along the rotating cam and be swung thereby, a rock-bar pivoted on the carriage supporting arm, a lug on the rock-bar engaged by the other arm of the angle lever to swing the rock-bar, mechanism on the carriage connecting the telescope tilting member in the carriage with the rock-bar whereby the rock-bar movement will tilt the telescope, the rock-bar having its axis inclined relative to the path of travel of the carriage on the arm whereby movement of the slide along the rock-bar as the carriage is adjusted along its supporting arm will vary the movement of the said telescope tilting member on the carriage.

15. In a range finder, the combination of a telescope supported to be tilted, a range indicating mechanism, a controlling member arranged to engage the telescope, mechanism operably connecting the indicating mechanism with said controlling member and organized to move said member in one direction to tilt the telescope according to the range indications, said controlling member being movable in another direction to vary the indications corresponding to the tilt of the telescope for different altitudes of the range finder, and mechanism organized to further move said controlling member to vary the amount of tilt of the telescope to correct for earth's curvature according to the range, the latter movement of said member for the same range being varied according to the adjustment of the member for altitudes.

16. In a range finder, the combination of a telescope supported to be tilted, a range indicating mechanism, a controlling member arranged to engage the telescope, mechanism operably connecting the indicating mechanism with the controlling member and organized to move the controlling member bodily in a direction transverse to the telescope to tilt the telescope according to the range indications, the controlling member being bodily movable on the connecting mechanism to be adjusted in a path approximately parallel with the telescope axis to vary the indications corresponding to the tilt of the telescope for different altitudes of the range finder, and mechanism organized to swing the controlling member on an axis to vary the amount of tilt of the telescope to correct for earth's curvature according to the range, the swinging movement of the controlling member for the various ranges being increased or decreased according to the respective movement bodily of such member away from or toward the tilting axis of the telescope.

17. In a range finder, the combination of a telescope supported to be tilted, a range indicating mechanism, a cam member arranged to engage the telescope, mechanism operably connecting the indicating mechanism with the cam and organized to move the cam bodily in a direction transverse to the telescope to tilt the telescope according to the range indications, the cam being bodily movable on the connecting mechanism to be adjusted in a path approximately parallel with the telescope axis to vary the indications corresponding to the tilt of the telescope for different altitudes of the range finder, and mechanism organized to swing the cam member on an axis to vary the amount of tilt of the telescope to correct for earth's curvature according to the range, the swinging movement of the cam for the various ranges being increased or decreased according to the respective movement bodily of the cam away from or toward the tilting axis of the telescope.

18. In a range finder, the combination of a telescope supported to be tilted, a range indicating mechanism, a cam member arranged to engage the telescope, mechanism operably connecting the indicating mechanism with the cam and organized to move the cam bodily in a direction transverse to the telescope to tilt the telescope according to the range indications, the cam being bodily movable on the connecting mechanism to be adjusted in a path approximately parallel with the telescope axis to vary the indications corresponding to the tilt of the telescope for different altitudes of the range finder, and mechanism organized to swing the cam member on an axis to vary the amount of tilt of the telescope to correct for earth's curvature according to the range, the rocking movement of the cam being varied according to the said altitude adjustment of the cam to give a constant corrective tilt of the telescope for each range indication.

19. In a range finder, the combination of a telescope mounted to tilt, a pivoted lever, a shaft, an indicating drum fast on said shaft connected with the lever, a carriage movably carried by the lever, a cam member pivoted on the carriage and engaging the telescope member by its cam surface to tilt the telescope upon the cam being swung, the carriage being adjustable on the lever to vary the relative movement of the telescope and range indicator caused by the swing of the said lever, to provide for the range indication for different altitudes of the range finder, an arm secured to the cam, a rock bar pivoted on the carriage supporting arm, a slide movably supported on the carriage and engaging the cam arm and the rock bar by its respective ends to cause the rock bar to tilt the cam arm, the rock bar and slide on the carriage being relatively arranged whereby the movement of the carriage away from or toward the axis of the telescope will cause the slide to engage the rock bar at a greater or less distance from its axis, and mechanism operably connecting the drum shaft with the rock bar on the lever to swing the rock bar by the rotation of the drum shaft.

Signed at Nos. 9-15 Murray street, New York, N. Y., this 21st day of April, 1906.

AMBROSE SWASEY.

Witnesses:
 WILLIAM H. REID,
 F. E. BOYCE.